(12) United States Patent
Matsu et al.

(10) Patent No.: US 7,823,908 B2
(45) Date of Patent: Nov. 2, 2010

(54) AIRBAG MODULE ASSEMBLY TO CONTROL GAP ADJACENT AIRBAG COVER

(75) Inventors: Richard Matsu, Plymouth, MI (US); David Palm, Davisburg, MI (US); Vern Phillips, Shelby Township, MI (US)

(73) Assignee: Autoliv ASP, Inc., Ogden, UT (US)

( * ) Notice: Subject to any disclaimer, the term of this patent is extended or adjusted under 35 U.S.C. 154(b) by 248 days.

(21) Appl. No.: 11/866,201

(22) Filed: Oct. 2, 2007

(65) Prior Publication Data
US 2009/0085334 A1 Apr. 2, 2009

(51) Int. Cl.
*B60R 21/203* (2006.01)
(52) U.S. Cl. .................... 280/728.2; 280/731
(58) Field of Classification Search ............... 280/731, 280/728.2, 728.3
See application file for complete search history.

(56) References Cited

U.S. PATENT DOCUMENTS

| | | | | |
|---|---|---|---|---|
| 5,508,481 A * | 4/1996 | Williams et al. ......... 200/61.54 |
| 5,508,482 A | 4/1996 | Martin et al. |
| 5,584,501 A * | 12/1996 | Walters ................ 280/728.2 |
| 6,082,758 A | 7/2000 | Schenck et al. |
| 6,125,716 A * | 10/2000 | Hosoi et al. ................ 74/552 |
| 6,139,051 A | 10/2000 | Fujita |
| 6,196,573 B1 * | 3/2001 | Worrell et al. .......... 280/728.2 |
| 6,491,319 B2 * | 12/2002 | Bonn .................... 280/731 |
| 6,508,485 B2 * | 1/2003 | Kikuta et al. ........... 280/728.2 |
| 6,688,637 B2 | 2/2004 | Igawa et al. |
| 6,719,324 B2 | 4/2004 | Richards et al. |
| 6,722,227 B2 | 4/2004 | Rabagliano et al. |
| 6,802,531 B2 | 10/2004 | Bohn et al. |
| 6,881,911 B2 | 4/2005 | Sugimoto |
| 7,278,509 B2 * | 10/2007 | Schroder et al. .......... 180/333 |
| 7,547,042 B2 * | 6/2009 | Chapelain et al. ......... 280/731 |
| 2006/0175816 A1 * | 8/2006 | Spencer et al. .......... 280/731 |
| 2006/0202444 A1 | 9/2006 | Rudduck et al. |
| 2007/0075527 A1 * | 4/2007 | Laue et al. ............ 280/728.2 |
| 2007/0278772 A1 * | 12/2007 | Burghardt et al. ........ 280/731 |
| 2009/0091107 A1 * | 4/2009 | Shimazaki et al. ........ 280/731 |

OTHER PUBLICATIONS

Notification of Transmittal of the International Search Report and the Written Opinion of the International Searching Authority issued Dec. 3, 2008 in International Application No. PCT/US2008/078533.

* cited by examiner

*Primary Examiner*—Paul N Dickson
*Assistant Examiner*—Karen Jane J Amores
(74) *Attorney, Agent, or Firm*—Sally J Brown; Stoel Rives LLP (57) ABSTRACT

An airbag module assembly is provided which may be used with a steering wheel unit that controls the gap between a driver airbag cover and adjacent steering wheel features. The airbag module assembly includes an airbag housing for enclosing an airbag in communication with an inflator. The airbag module assembly also includes an airbag cover that is coupled to a cover suspension module, which in turn is coupled to the steering wheel unit. The cover suspension module includes a biasing element disposed within a housing and a locating feature extending from the housing.

12 Claims, 10 Drawing Sheets

AIRBAG MODULE ASSEMBLY TO CONTROL GAP ADJACENT AIRBAG COVER

TECHNICAL FIELD

The present disclosure relates generally to the field of automotive protective systems. More specifically, the present disclosure relates to airbag module components for limiting the tolerance chain between an airbag cover and its mounting location in a vehicle.

BRIEF DESCRIPTION OF THE DRAWINGS

Understanding that the drawings depict only typical embodiments and are not therefore to be considered limiting, exemplary embodiments will be described and explained with additional specificity and detail through the use of the accompanying drawings in which.

DETAILED DESCRIPTION

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The phrases "connected to", "coupled to" and "in communication with" refer to any form of interaction between two or more entities, including mechanical, electrical, magnetic, electromagnetic, fluid and thermal interaction. Two components may be coupled to each other even though they are not in direct contact with each other. The phrases "attached to" or "attached directly to" refer to interaction between two or more entities which are in direct contact with each other or are separated by a fastener.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

The present disclosure relates to airbag module components for limiting the components in the tolerance chain between an airbag cover and its mounting location in a vehicle, such as within a steering wheel apparatus. The reduction in the tolerance chain may help control the gap that exists between a driver airbag cover and adjacent steering wheel features. Such gap control may be beneficial as the automotive industry continues to specify smaller gaps between the driver airbag cover and adjacent steering wheel features. Conventionally, such gaps are controlled at the interface between the driver airbag module and the steering wheel at the driver airbag to steering wheel armature attachment location. This arrangement includes the armature and polyurethane foam of the steering wheel as discrete elements, thereby including their variance and causing a larger gap. Other conventional arrangements to reduce the gap use additional mechanical elements to achieve the desired result.

Figure 1A:
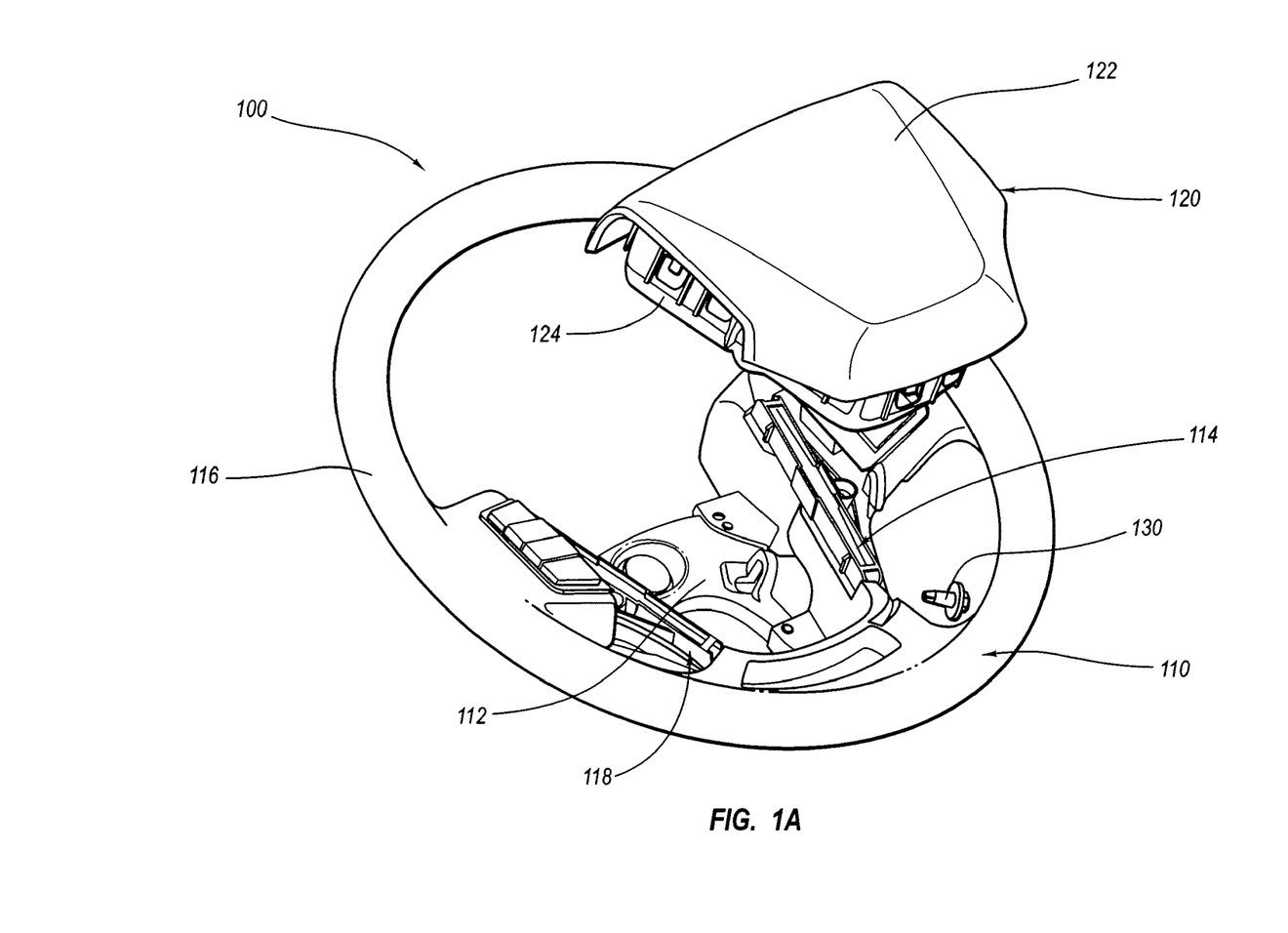
FIG. 1A is an exploded perspective top view of one embodiment of a steering wheel apparatus.
Figure 1B:
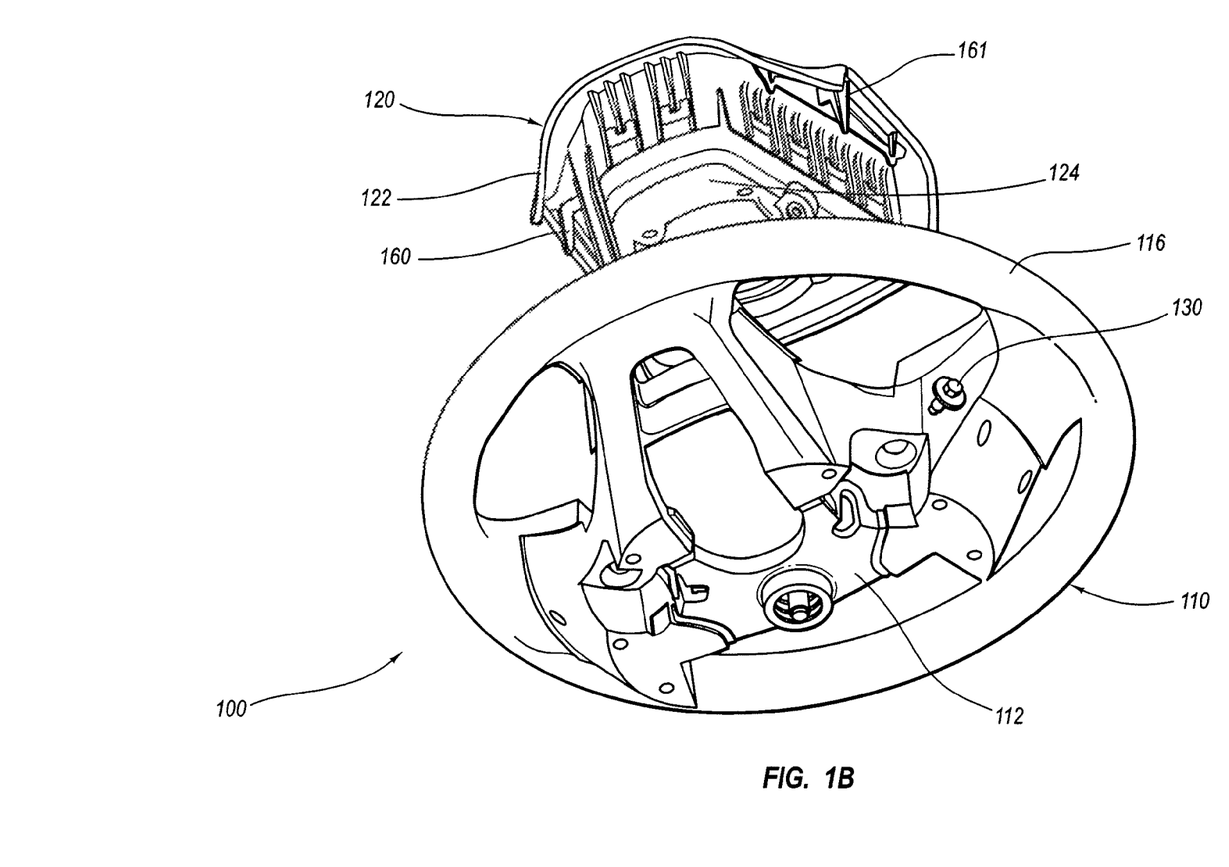
FIG. 1B is an exploded perspective bottom view of the steering wheel apparatus of FIG. 1A.

With reference to the accompanying drawings, FIGS. 1A and 1B are perspective top and bottom views of one embodiment of a steering wheel apparatus 100. The steering wheel apparatus 100 includes a steering wheel unit 110 and a driver airbag module or unit 120. The steering wheel unit 110 has a steering wheel armature 112, and a foam portion 116 substantially surrounding armature 112. The driver airbag unit 120 has a driver airbag cover 122 coupled to a housing 124. As shown in FIG. 1B, locating features such as a pair of cover guide pins 160 and 161, discussed in further detail hereafter, are located on opposite sides of cover 122. An attach bolt 130 is optionally used to couple driver airbag unit 120 to steering wheel unit 110. A pair of horn carriers 114, 118 are secured to the steering wheel unit 110. As will be describe in greater detail below, the horn carriers 114, 118 include electrical contacts or actuation points to actuate the horn when the airbag cover 122 is depressed by a user.

Figure 2:
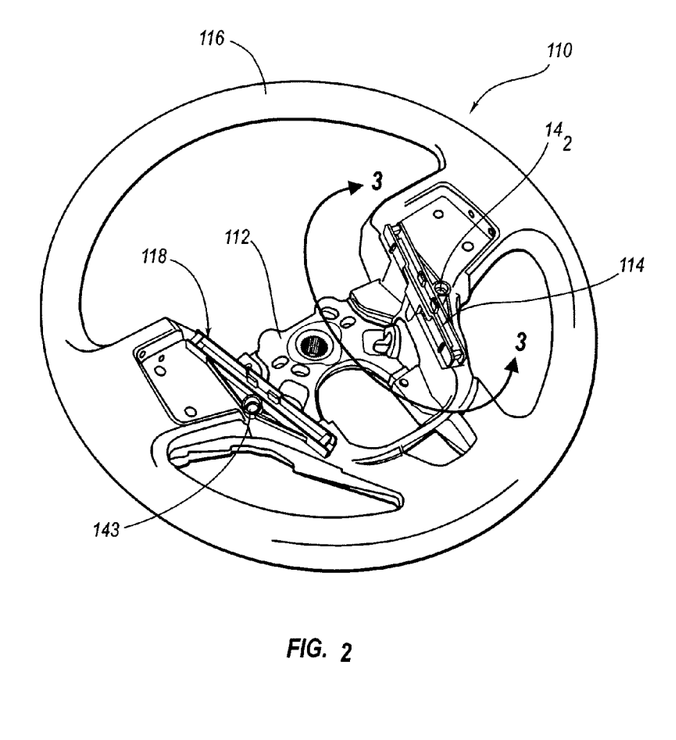
FIG. 2 is a perspective view of the steering wheel unit of the embodiment of FIG. 1A.
Figure 3:
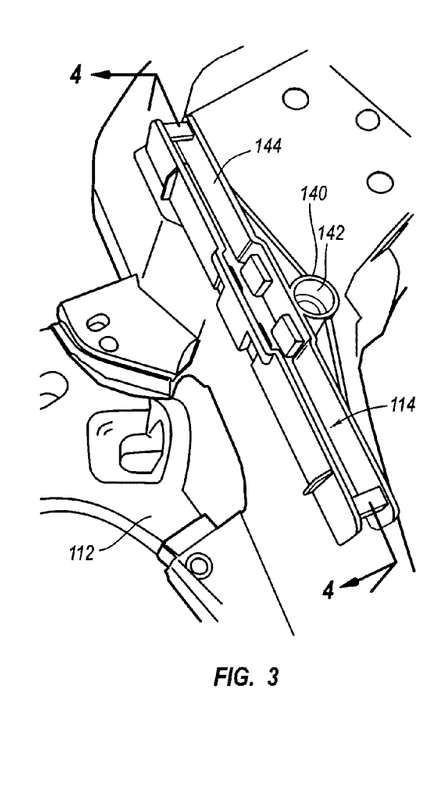
FIG. 3 is an enlarged perspective view of the steering wheel unit of FIG. 2.
Figure 4:
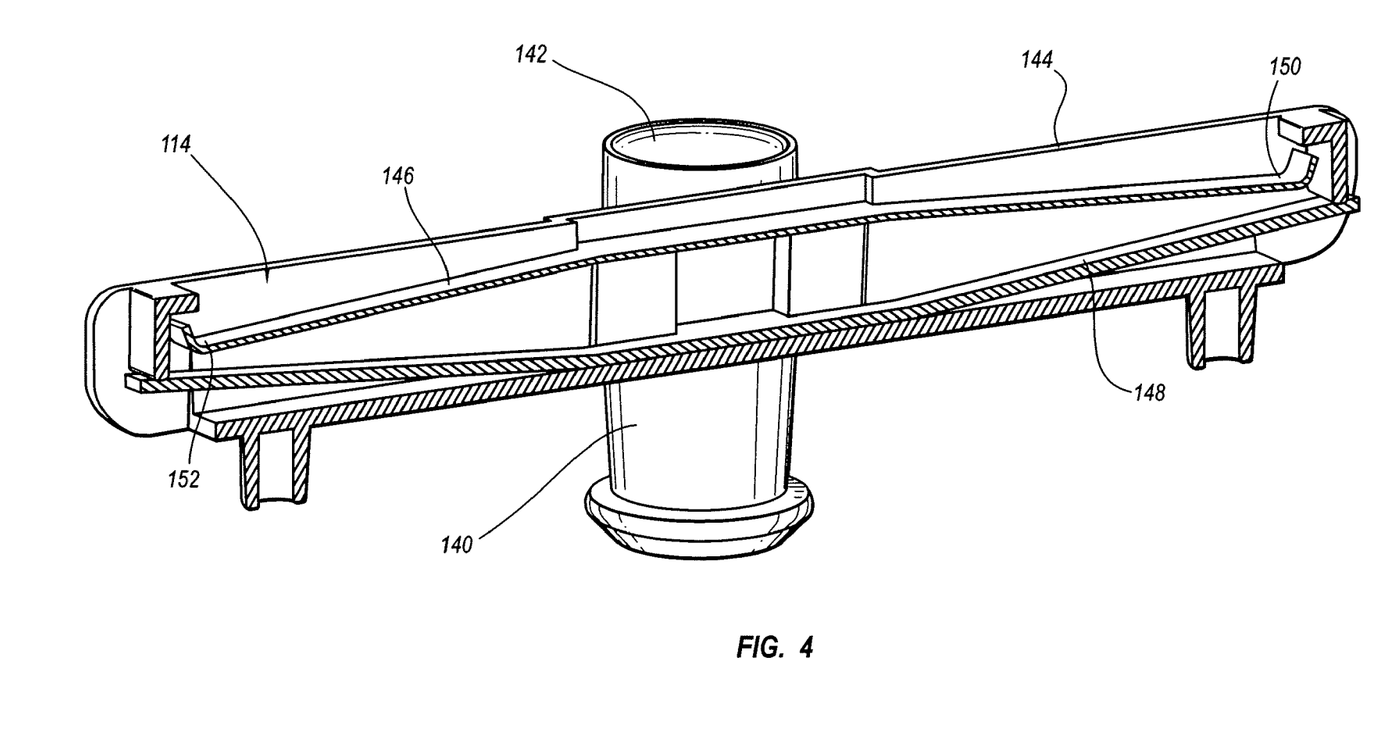
FIG. 4 is a cross section perspective view taken along line 4-4 in FIG. 3.

FIG. 2 is a perspective view of steering wheel unit 110 without driver airbag unit 120. As shown, horn carrier 118 is positioned on foam portion 116 to opposingly face horn carrier 114. An enlarged sectional view of armature 112 showing additional details of horn carrier 114 is shown in FIG. 3. The horn carrier 114 includes a cylindrical section 140 having a guide hole 142 therein for attachment of cover 122 of driver airbag unit 120. The cylindrical section 140 may be integrally attached to a horn spring housing 144. FIG. 4 is a cross section view of horn carrier 114 taken along line 4-4 in FIG. 3, showing the interior of horn spring housing 144. As depicted in FIG. 4, an upper horn spring 146 and an opposing lower horn spring 148 are disposed within housing 144. A pair of horn actuation points 150 and 152 are located on opposite ends of upper horn spring 146.

Upper horn spring 146 may be biased away from lower horn spring 148, such that under normal operating conditions they do not contact. However, when a user depresses the airbag cover 122, the upper horn spring 146 is pushed against its bias and contacts lower horn spring 148 at horn actuation points 150, 152. The contact completes an electrical circuit actuating the horn. It should be noted that horn carrier 118 shown in FIG. 2 may have the same features as those discussed above for horn carrier 114, including a guide hole 143.

Figure 5:
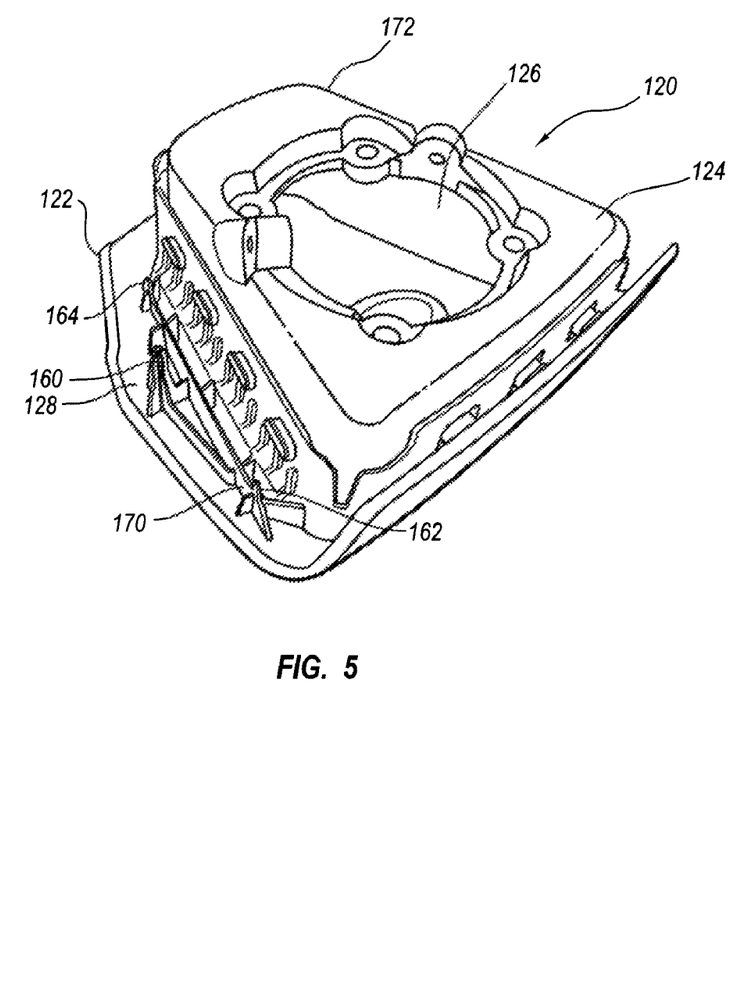
FIG. 5 is a perspective view of the driver airbag unit of the embodiment of FIG. 1A.
Figure 6:
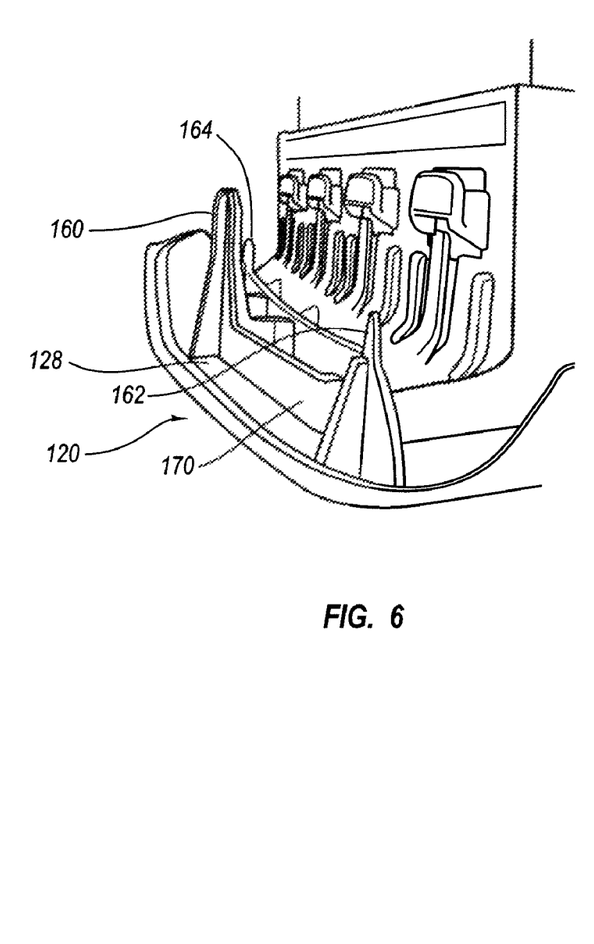
FIG. 6 is an enlarged perspective view of the driver airbag unit of FIG. 5.

The driver airbag unit 120 is shown in further detail in FIGS. 5 and 6. As depicted in FIG. 5, housing 124 of driver airbag unit 120 defines an airbag chamber 126 for holding an uninflated airbag (not shown). The cover guide pin 160 may be integrally attached to a lower surface 128 of cover 122 on a first side 170 of driver airbag unit 120. A pair of horn actuation pins 162 and 164 may be integrally attached to cover 122 at opposing ends of first side 170, with cover guide pin 160 interposed therebetween at a slightly offset position. It should be noted that cover guide pin 161 and a pair of corresponding horn actuation pins are located on an opposite second side 172 of driver airbag unit 120.

During assembly, driver airbag unit 120 is attached to steering wheel unit 110 by inserting cover guide pins 160 and 161 into the corresponding guide holes 143 and 142 in horn carriers 118 and 114. This aligns the horn actuation pins on each side of cover 122 with corresponding horn actuation points on the horn springs of horn carriers 114 and 118. The optional attach bolt 130 is then inserted through armature 112 into housing 124 and secured therein to couple driver airbag unit 120 to steering wheel unit 110.

By reducing the number of components in the tolerance chain between the airbag cover 122 and actuation of the horn and locating to the foam portion 116, the gap between cover 122 and steering wheel unit 110 is better controlled. The airbag module housing 124 and the armature 112 is not in the tolerance chain as it is in conventional systems.

Figures 7, 8:
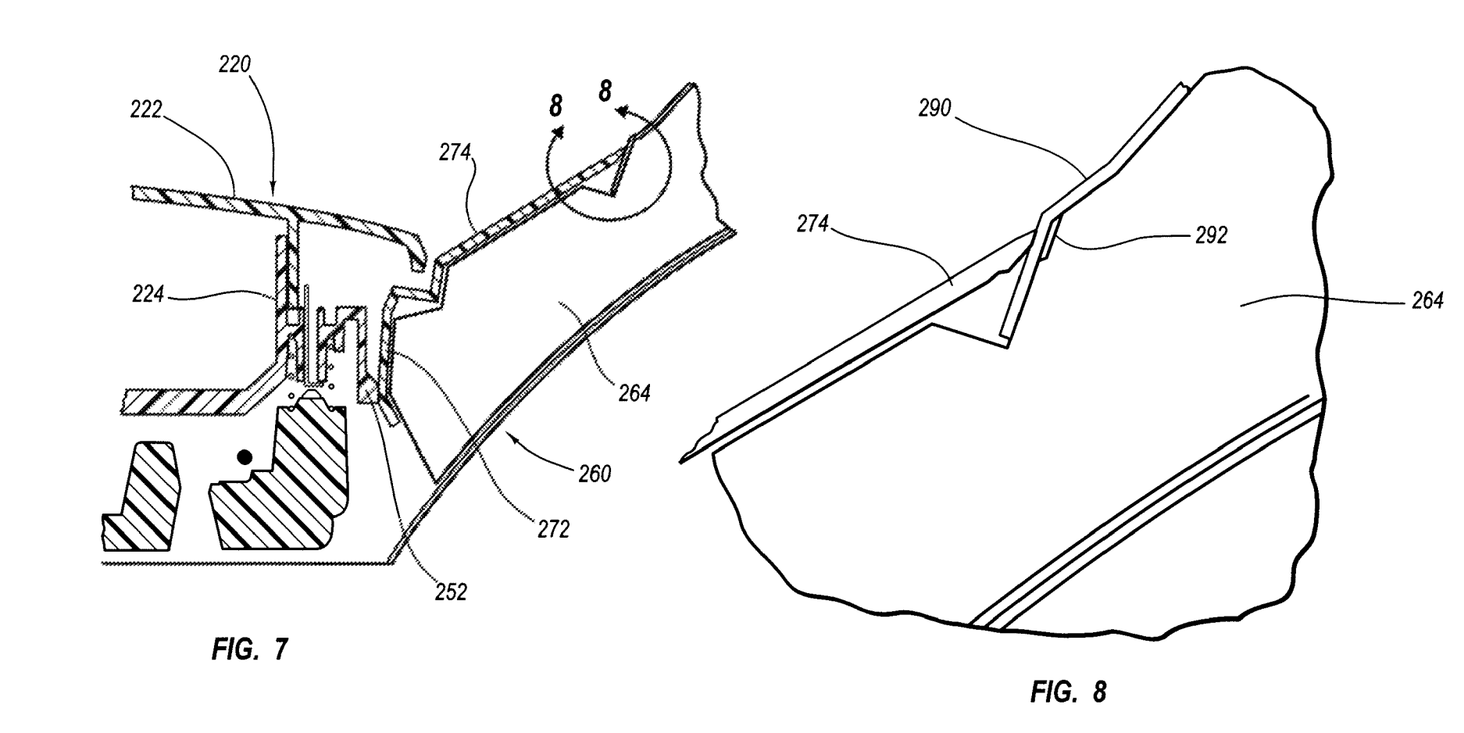
FIG. 7 is a schematic cross section view of one embodiment of a driver airbag unit attached to a steering wheel unit.
FIG. 8 is an enlarged sectional view of the steering wheel unit shown in FIG. 7.

Another embodiment of a driver airbag unit 220 coupled to a steering wheel unit 260 is shown in FIG. 7, from a cross sectional view. The driver airbag unit 220 is coupled to steering wheel unit 260 by aligning guide leg 252 with a finisher leg 272. Finisher leg 272 may extend from optional plastic spoke finisher 274, which may act as a guiding surface. This allows module housing 224 and cover 222 to nest near the edge of spoke finisher 274, and provides for self centering of driver airbag unit 220. Self centering may be achieved by having similar features on the opposite side of the airbag unit 220, which helps increase the symmetry of the gaps between the cover 222 and the adjacent steering wheel. The armature, foam, and lower attachment architecture of steering wheel unit 260 are thus eliminated from the tolerance chain, which provides more gap control. In alternative embodiments, the locating features of the cover and/or housing may be coupled to the foam portion 264 instead of the finisher leg 272.

As shown in FIG. 8, spoke finisher 274 acting as a trim piece "bites" into a material layer such as a leather layer 290 covering foam portion 264 to eliminate any resultant tolerances concern. A steel safe "tuning groove" 292 is used to adjust the fit of spoke finisher 274 on the steering wheel and allows the spoke finisher 274 to move without affecting or creating a gap.

Figure 9:
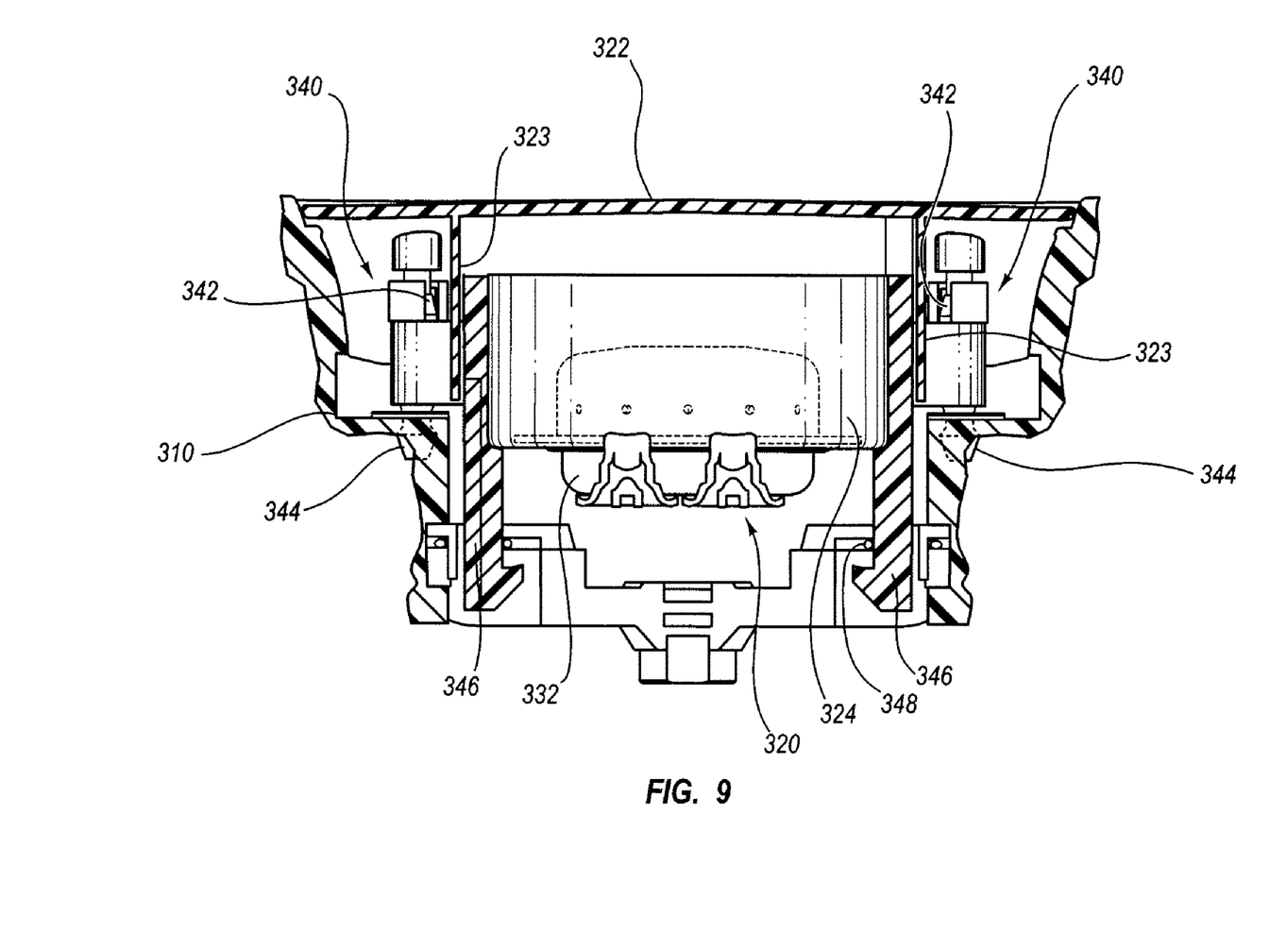
FIG. 9 is a side elevation cross sectional view of another embodiment of an airbag module coupled to a mounting surface.

FIG. 9 depicts another embodiment of an airbag module 320 coupled to a mounting surface 310, as shown from a side elevation cross sectional view. In one embodiment, the mounting surface 310 comprises a steering wheel unit. However, in an alternative embodiment, the mounting surface comprises an instrument panel, where the airbag module 320 is a passenger-side airbag module. The airbag module 320 comprises an airbag housing 324 which houses an airbag in an undeployed state, the airbag being in fluid communication with an inflator 332. An airbag cover 322 is disposed over the housing 324.

The airbag module 320 also includes a cover suspension module 340 on either side of the airbag housing 324 and below the periphery of the cover 322. The cover suspension module 340 includes a suspension module housing 342, which houses a biasing element. The suspension module housing 342 will be described in greater detail below. A locating feature, such as a XYZ locating pin 344, extends from the suspension module housing 342 and engages the mounting surface 310, such as a steering wheel unit in an interference fit.

A chute wall 323 extends downward from the airbag cover 322 adjacent the periphery of the airbag module housing 324. The chute wall 323 may optionally engage an abutment from the housing (not shown), such that when a user depresses the cover, the chute wall 323 also pushes downward on the abutment, which causes the housing 324 and cover suspension module 340 to move. A small gap may exist between the chute wall 323 and the airbag module housing 324 so that X-Y location is not affected by the sidewalls of the housing 324. In the embodiment depicted, however, the Z-height may be controlled by the housing 324.

The airbag module assembly 320 includes engaging arms 346 that extend from the base of the airbag housing 324. The engaging arms 346 may have a barbed or hooked end for engaging a spring wire 348 disposed within the steering wheel unit or instrument panel. According to the embodiment depicted, the hooks on the end of the engaging arms 346 extend beyond the spring wire 348 and are not engaged with the spring wire 348 during normal operation of the vehicle. The cover suspension modules 340 maintain the airbag module assembly 320 in its desired mounting location 310 during normal operation. However, during a deployment event, the force of the rapidly expanding inflation gas exiting the inflator 332 may cause the airbag module 320 to dislodge from its mounting location despite the cover suspension modules 340. If the airbag module 320 does break free from its mounting location 310, the hooks on the end of the engaging arms 346 engage the spring wire 348 and prevent the airbag module 320 from ejecting out of its mounting location 310.

Figure 10:
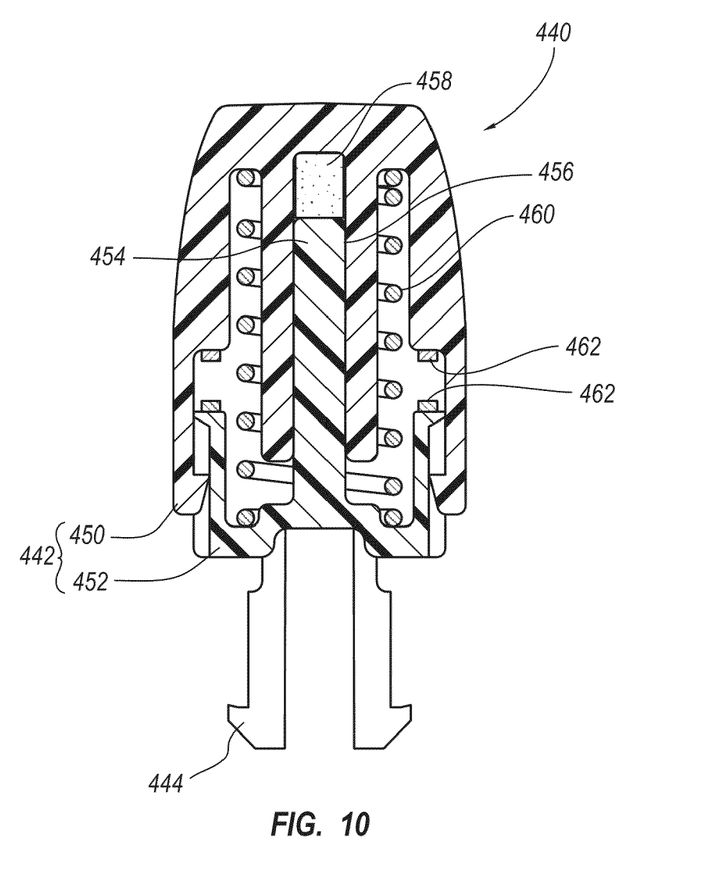
FIG. 10 is a side elevation cross sectional view of one exemplary embodiment of a cover suspension module.

FIG. 10 depicts one embodiment of a cover suspension module 440 as shown from a side elevation cross sectional view. The cover suspension module 440 comprises a suspension module housing 442, which may optionally be constructed of plastic and includes a first component 450 and a second component 452 which are coupled together in a snap engagement. The second component 452 may include a locator extension 454 that is slidably received by a channel 456 formed by the first component 450. Beyond the end of the locator extension 454, within the channel 456 of the first component 450 there may exist a dampening material 458, such as a shock-absorbing, open-cell foam material.

A XYZ locating pin 444 extends below the second component 452 and is configured to engage the mounting surface of a steering wheel unit or other mounting surface. A spring 460 or similar biasing element may be disposed within the housing 442 of the cover suspension module 440. The spring 460 biases the first component 450 away from the second component 452, which in turn biases the airbag cover away from the mounting location, such as the steering wheel unit. However, when a user depresses the cover of the airbag module, the cover pushes on the first component 450, which moves into greater mating engagement with the second component 452 against the bias of the spring 460.

According to the embodiment of FIG. 10, the cover suspension module 440 also includes electrical contacts 462 disposed inside the module housing 442 that are spaced apart from each other due to the bias of the spring 460. When a user depresses the airbag cover and the first component 450 comes closer to second component 452, the electrical contacts 462 contact each other, completing a circuit and actuating the horn. As will be discussed below, the electrical contacts 462 may also be disposed outside of the cover suspension module housing 442.

Figure 11:
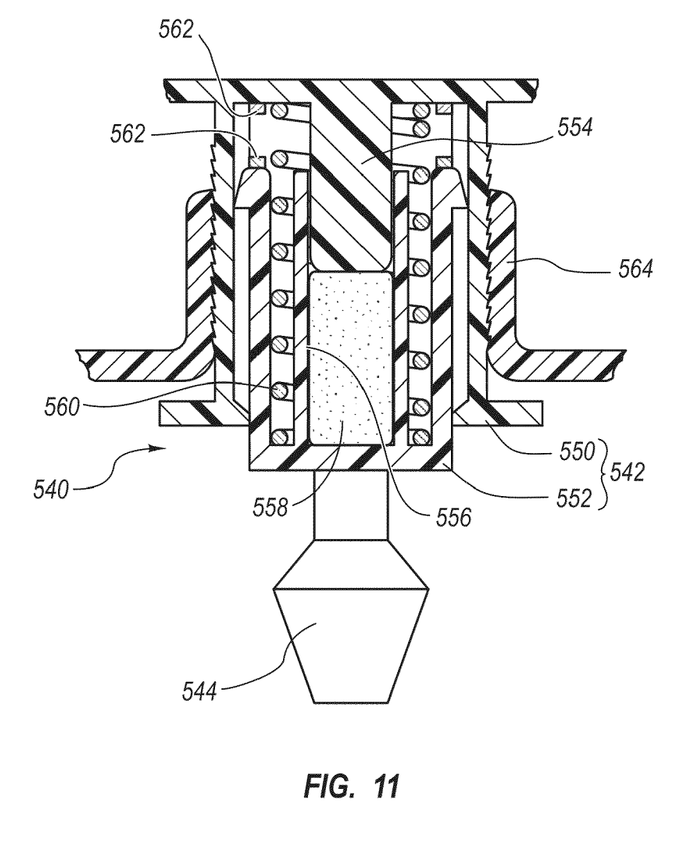
FIG. 11 is a side elevation cross sectional view of another embodiment of a cover suspension module.

FIG. 11 depicts another alternative embodiment of a cover suspension module 540 as shown from a side elevation cross sectional view. The cover suspension module 540 comprises a suspension module housing 542, which includes a first component 550 with and a second component 552, which are coupled together. A one way fastener 564, similar to a zip tie, may be disposed outside and engage the suspension module housing 542. According to one embodiment, a second one way fastener 564 may engage the airbag cover. The first component 550 may include a locator extension 554 that is slidably received by a channel 556 formed by the second component 552. A dampening material 558, such as an open-cell foam, may exist beyond the end of the locator extension 554, within the channel 556 of the second component 552.

Similar to the embodiment of FIG. 10, a XYZ locating pin 544 extends below the second component 552 and is configured to engage the mounting surface. A spring 560 may be disposed within the housing 542 of the cover suspension module 540, which biases the first component 550 away from the second component 552. When a user depresses the cover of the airbag module, the cover pushes the first component 550 closer to the second component 552 against the bias of the spring 560. Electrical contacts 562 disposed inside the module housing 542 that are originally spaced apart from each other complete a circuit when contact and actuate the horn.

Figure 12:
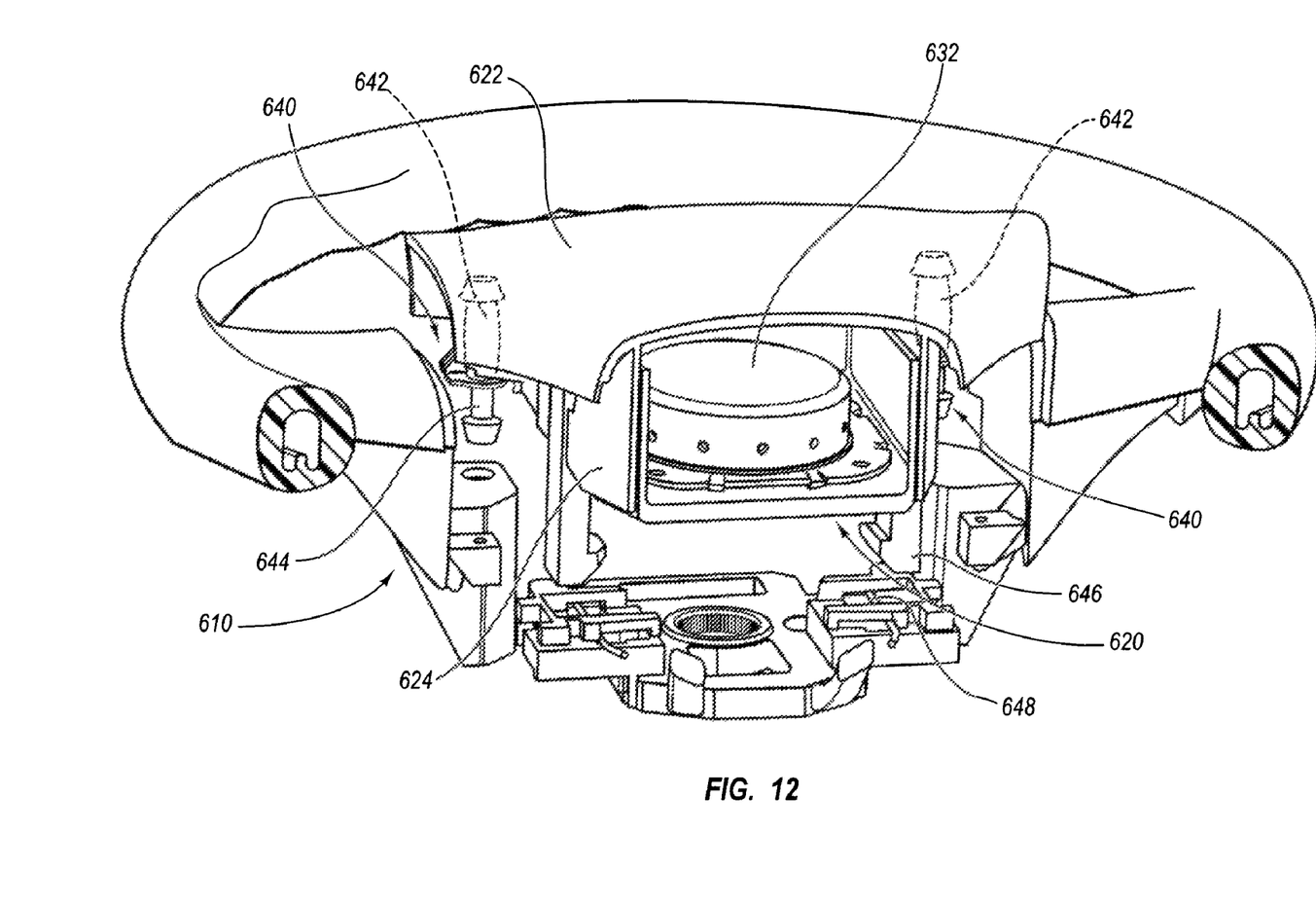
FIG. 12 is a partially cut away exploded perspective view of another embodiment of an airbag module couplable to a steering wheel unit.

FIG. 12 illustrates another embodiment of an airbag module 620, configured to be coupled to a steering wheel unit 610, as shown from a partially cut away, exploded perspective view. The airbag module 620 comprises an airbag housing 624 which houses an airbag in an undeployed state, the airbag being in fluid communication with an inflator 632. An airbag cover 622 is disposed over the housing 624.

The airbag module 620 also includes three cover suspension modules 640 (one of which is not shown in the cut away portion). Two of the suspension modules are disposed on either side of the airbag housing 624 and below the periphery of the cover 622. In one embodiment, the third suspension module is at the 6:00 position along the steering wheel, while the aforementioned suspension modules 640 are at the 3:00 and 9:00 positions. In such an embodiment, the sum of the force vectors may be approximately zero in the X-Y plane, where the 3:00 position and the 9:00 position have an equal vector magnitude but opposite direction, while the 6:00 position (or alternatively the 12:00 position) vector is approximately zero in the X-Y plane.

In alternative embodiments greater or less than three cover suspension modules 640 may be used. Where four cover suspension modules are used, they may be positioned at orthogonal positions relative to each other having vector magnitudes and directions to sum approximately zero. Moreover, three cover suspension modules may be positioned at, for example, the 2:00, 6:00 and 10:00 positions (or alternatively, 12:00, 4:00 and 8:00, etc.), all having vectors of equal magnitude and direction toward the center, where the sum of the vectors is approximately zero.

The cover suspension module 640 includes a suspension module housing 642, which houses a biasing element. A XYZ locating pin 644, extends from the suspension module housing 642 and is configured to engage the steering wheel unit 610 in an interference fit. The airbag module assembly 620 also includes engaging arms 646 that extend from the base of the airbag housing 624. The engaging arms 646 may have a hooked end for engaging a spring wire 648 disposed within the steering wheel unit 610 during a deployment event.

In the embodiment of FIG. 12, two of the three cover suspension modules 640 of the airbag module assembly 620 are located on opposite sides of the periphery of the cover 622. With the suspension modules 640 on either side of the airbag module housing 642, the resulting structure acts like a three-bar linkage and allows the cover 622 to be self-centering. The three-bar linkage comprises a first theoretical bar extending coaxially with the first suspension module 640, a second theoretical bar extending coaxially with the second suspension module 640 and a third horizontal theoretical bar interconnecting the two through the airbag module housing 624. Foam from the steering wheel unit 610 provides stability to the linkage and a self-centering effect.

Figure 13:
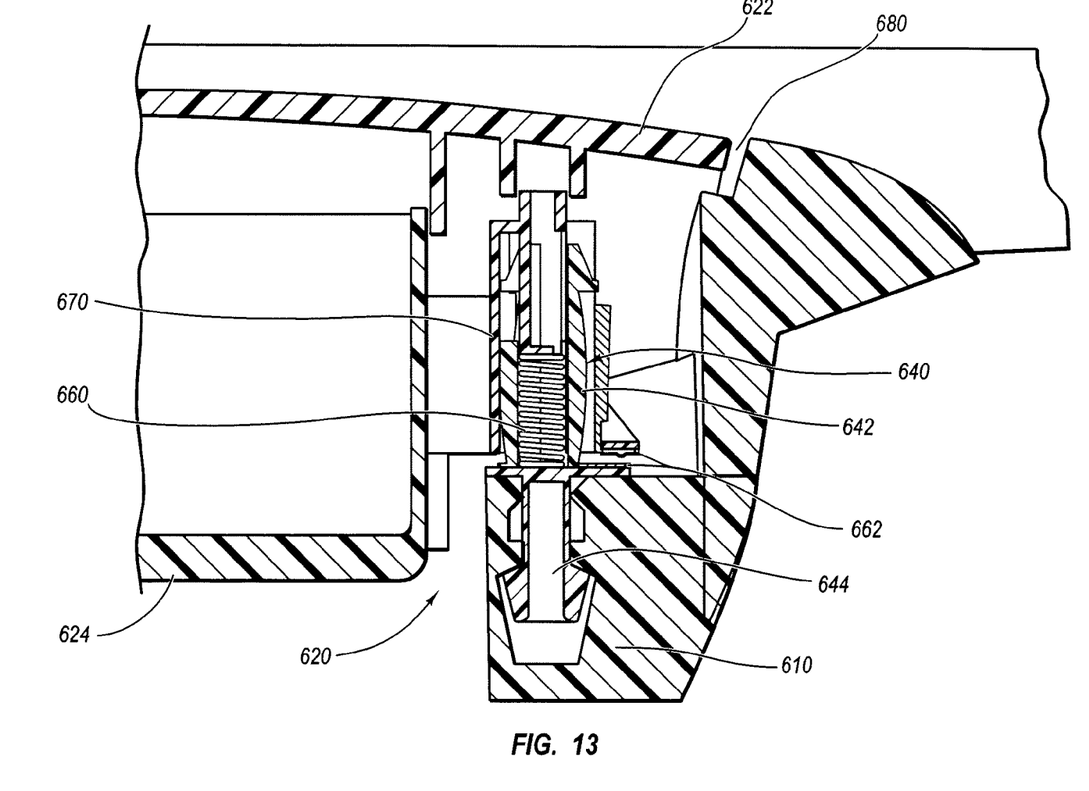
FIG. 13 is an enlarged side elevation cross sectional view of the airbag module of FIG. 12.

FIG. 13 depicts the airbag module 620 of FIG. 12, as shown from an enlarged side elevation cross sectional view. The cover suspension module 640 includes a suspension module housing 642 that is barrel shaped, in that the ends of the housing 642 are tapered so that the diameter of the housing 642 is greater in the middle portion than the diameter at either end. The barrel shape of the suspension module housing 642 may be helpful in self-centering and reduction of binding compared to cylindrical housings. For example, the barrel shape is capable of keeping the effort required for horn actuation to an acceptable level. In some conventional systems using cylindrical housings, any deviation from normal may result in binding and an increase in the effort required for horn actuation. According to the embodiment of FIG. 13, the barrel-shaped suspension module 640 is slidably received by an extension 670 of the airbag module housing 624. Another extension 670 is disposed on the opposite side of the airbag module 620 to receive the opposite cover suspension module 640.

A XYZ locating pin 644 extends below the suspension module housing 642 and is configured to engage the steering wheel unit 610. A spring 660 is disposed within the housing 642 of the cover suspension module 640, which biases the airbag cover 622 away from the steering wheel unit 610. Electrical contacts 662 are disposed outside the suspension module housing 642. The electrical contacts 662 are spaced apart from each other until a user depresses the cover 622. The spaced apart electrical contacts 662 subsequently come into contact with each other and complete a circuit which actuates the horn.

By reducing the number of components in the tolerance chain between the airbag cover 622 and the steering wheel unit 610, the gap 680 between cover 622 and steering wheel unit 610 is better controlled. The airbag module housing 624 is not in the tolerance chain as it is in conventional systems.

The present disclosure may be embodied in other forms without departing from its essential characteristics. The described embodiments are to be considered in all respects only as illustrative and not restrictive. The scope of the invention is therefore indicated by the following claims rather than by the foregoing description. All changes that come within the meaning and range of equivalency of the claims are to be embraced within their scope.

What is claimed is:

1. An airbag module assembly for a steering wheel, comprising:
 an airbag housing, which houses an airbag in communication with an inflator;
 a plurality of engaging arms extending from the airbag housing, wherein each engaging arm has a length that permits each engaging arm to extend into a steering wheel unit, wherein each engaging arm terminates at an end;

a cover disposed over the airbag housing; and a plurality of cover suspension modules, wherein each cover suspension module is coupled to the cover and is configured to be coupled to the steering wheel unit, wherein each cover suspension module comprises a locating feature configured to be coupled to the steering wheel unit; and a biasing element positioned to bias the cover away from the steering wheel unit;

wherein each end of each engaging arms is configured such that, when each locating feature is coupled to the steering wheel unit and each engaging arm has been extended into the steering wheel unit, each end of each engaging arm extends beyond a spring wire in the steering wheel unit and each end is positioned to engage the spring wire upon a deployment event to keep the airbag housing coupled to the steering wheel unit, wherein each cover suspension module further comprises a suspension module housing, wherein the suspension module housing has a first and second end, wherein the first and second ends are tapered such that a diameter of a middle portion of the suspension module housing is greater than a diameter of the first end of the housing and is greater than a diameter of the second end of the housing.

2. The airbag module assembly of claim 1, wherein each suspension module housing further comprises electrical contacts, such that depressing the cover against the bias of the biasing element completes a circuit between the electrical contacts and a horn is actuated.

3. The airbag module assembly of claim 2, wherein the electrical contacts are disposed outside of the suspension module housing.

4. The airbag module assembly of claim 1, wherein the cover suspension module further comprises a dampening material disposed within the suspension module housing.

5. The airbag module assembly of claim 4, wherein the dampening material comprises a shock-absorbing open cell foam material.

6. The airbag module assembly of claim 1, wherein the suspension module housing is slidably received by an extension of the airbag module housing.

7. The airbag module assembly of claim 1, wherein the plurality of cover suspension modules comprises three cover suspension modules and each cover suspension module is disposed adjacent the periphery of the cover.

8. The airbag module assembly of claim 7, wherein two of the three cover suspension modules are disposed on opposite sides of the periphery of the cover and allow the cover to be self-centering.

9. The airbag module of claim 8, wherein the airbag housing comprises extensions which slidably receive the cover suspension modules on opposite sides of the periphery of the cover, such that the two cover suspension modules and the airbag module housing form a three-bar linkage to allow the cover to be self-centering.

10. The airbag module assembly of claim 1, wherein each locating feature is configured to create an interference fit with the steering wheel unit.

11. The airbag module assembly of claim 1, wherein after each locating feature is coupled to the steering wheel and each engaging arm has been extended into the steering wheel unit then each cover suspension module is located adjacent to a periphery of the cover and each cover suspension module is located laterally between the airbag housing and the steering wheel unit.

12. The airbag module assembly of claim 1, wherein after each locating feature is coupled to the steering wheel and each engaging arm has been extended into the steering wheel unit then the cover suspension module directly interconnects the steering wheel unit and the cover, and the cover directly contacts the cover suspension module without pressing through an airbag cushion.

* * * * *